Feb. 8, 1949.　　　　　E. BODMER　　　　　2,461,027
CHANGE SPEED TRANSMISSION FOR AUTOMATIC LATHES
Filed June 10, 1944　　　　　　　　　　　3 Sheets-Sheet 1
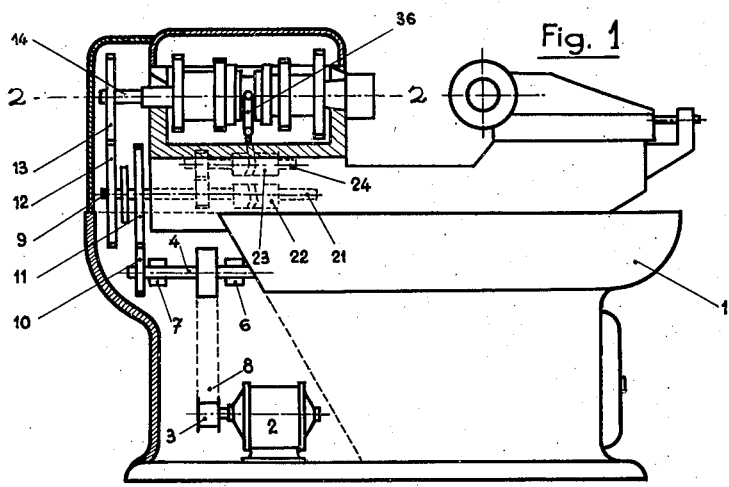
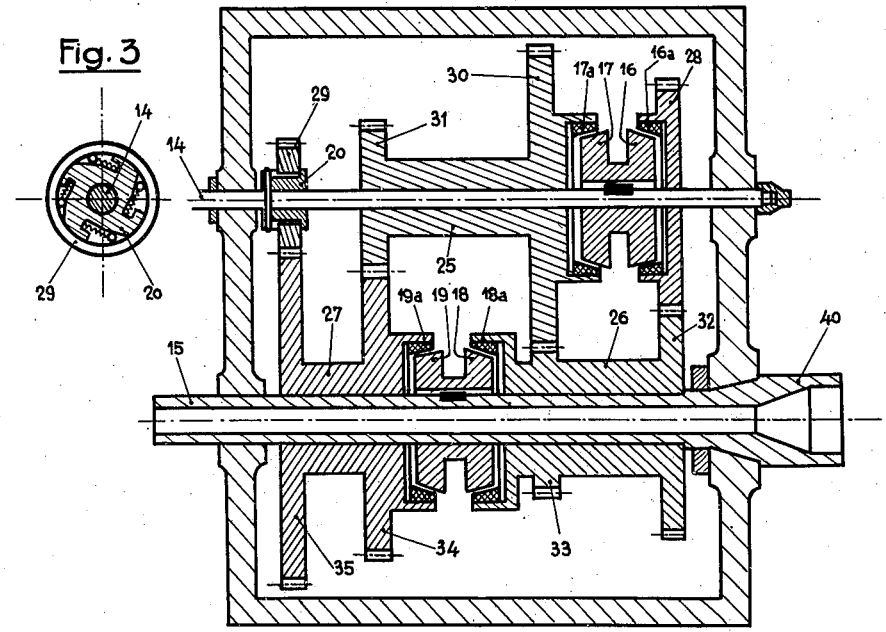
INVENTOR
Ernest Bodmer.
BY William Stero Groff
ATTORNEYS Feb. 8, 1949.   E. BODMER   2,461,027
CHANGE SPEED TRANSMISSION FOR AUTOMATIC LATHES
Filed June 10, 1944   3 Sheets-Sheet 2

INVENTOR
*Ernest Bodmer.*
BY *Wachander & Groff*
ATTORNEYS

Feb. 8, 1949.   E. BODMER   2,461,027
CHANGE SPEED TRANSMISSION FOR AUTOMATIC LATHES
Filed June 10, 1944   3 Sheets-Sheet 3

INVENTOR
*Ernest Bodmer.*
BY *Wachauter & Groff*
ATTORNEYS

Patented Feb. 8, 1949

2,461,027

UNITED STATES PATENT OFFICE 2,461,027

CHANGE-SPEED TRANSMISSION FOR AUTOMATIC LATHES

Ernest Bodmer, Geneva, Switzerland

Application June 10, 1944, Serial No. 539,754
In Switzerland July 23, 1943

2 Claims. (Cl. 74—359)

All the automatic lathes known at present are provided with a change-speed-gear for two, three or four speeds so that the rotation speed of the spindle can be adapted to the various operations necessary for the machining of a piece. These change-speed-gears are generally placed in the lower part of the frame of the lathe, close to or just under the motor of same. A multitude of change-speed-gears varying in their automatic control or also in their construction have been worked out by makers of automatic lathes. They are generally constituted by at least two parallel sets of gears connecting mechanically the motor-shaft with the spindle-shaft by means of friction couplings.

Several of these gear-boxes have chain-gears; then, the high speeds of rotation of the spindle now in use, thanks to hard-metal tools, cause a very rapid wearing out of these transmission-chains, and, in certain cases, the speed limit which such transmission can stand has been reached. Moreover, the greater the lineal speed of the transmission chain the greater the friction and therefore the smaller the efficiency of transmission. Finally, a change-speed-gear having three or four different speeds has generally three or four parallel sets of gears connected to the spindle axis by two chain-gears and two friction-couplings. These two chains operate alternatively but both are constantly dragged along, one of them running free.

Some makers have proposed change-speed-gears with sliding sets of gears; this in order to do away with the chains. However, in such change-speed-gears, the sliding set having to be operated by hand, it is obvious that they cannot be used in automatic lathes.

Other makers have finally built change-speed-gears having two shafts, one conductor or main shaft and a driven shaft, the latter being constituted by the spindle axis, and two double friction-couplings automatically controlled in order to obtain four different speeds.

However, these change-speed-gears do not permit, in the course of machining a piece, the most rational cutting-speeds, as they do not permit changes of speed presenting a high ratio between the maximum and the minimum speeds. Indeed, the hard metals used for the carriage-tools permit a very high cutting speed, which is about three times higher than those required for tools made of high speed steel as used for stumping operations, and seven to eight times higher than the highest speeds allowed for a tapping operation for instance. In order to obtain such speed relations by means of two gears, it would be necessary to provide gears of exaggerated sizes and having a great inertia bulk, or still an intermediary shaft so as to place three gears in series between the main shaft and the spindle.

The object of the present invention is an automatic mono-spindle lathe having a change-speed-gear automatically operated and having parallel sets of gears connecting mechanically a main shaft to the spindle shaft by the intermediary of at least four friction clutches constituted by at least two double friction couplings.

This lathe eliminates the above mentioned disadvantages by the fact that the main shaft and the spindle shaft have each at least two friction clutches constituted by a double coupling of which at least one of the parts mounted free on their shaft is part of a gear member having two gears, each of the latter being mechanically connected to a gear connected to a part of a coupling mounted free on the other shaft.

Further at least one of the four parts of these two double couplings which are mounted loose on their shaft can be part of a gear member being part of a change-speed-gear and having two gears in mesh each with a gear part of each of the gear parts of the second double coupling.

Furthermore the main shaft and the spindle shaft may each carry at least one double coupling connected by members of a change-speed-gear having a gear member mounted on each of the main and the driven shaft and a part of one of the parts of each of the two couplings mounted loose on their shaft, each gear member having two gears, and in which a gear of each gear member is in mesh with a gear of the other, the second gear of each gear member being in mesh with a gear part of the second part of each of the two double couplings mounted loose on its shaft.

Further the main shaft and the spindle shaft may carry each at least a double coupling connected by a change-speed-gear having three gear members each comprising two gears, one of these gear members mounted on one of the two shafts of the change-speed-gear is in mesh with each of the other two gear members which are both mounted on the second shaft of the change-speed-gear, each of its three gear members being a part of one of the parts mounted loose on their shaft of the two double couplings.

And furthermore the change-speed-gear having three gear members each comprising two gears may have a one-way coupling mounted on the shaft carrying a single gear member, and of which one of the parts is rigidly fixed on the said shaft, while the other carries a gear in mesh with a second gear of one of the two gear members mounted on the other shaft of the change-speed-gear.

The annexed drawing shows schematically and as an example a lathe in accordance with the present invention, as well as several variations in making a change-speed-gear.

Fig. 1 is side view of a lathe, parts of which being cut;

Fig. 2 is a cross section, on line 2—2 of Fig. 1, of a first variant execution of a change-speed-gear;

Fig. 3 is a cross section of a form of execution of a coupling with one way impulse;

Figure 4:
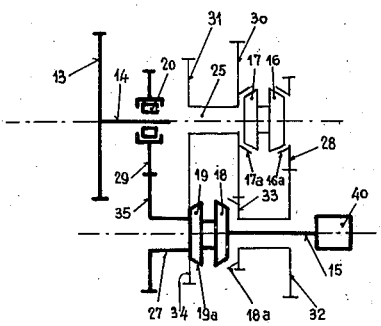
Figs. 4 to 9 are schematic views meant to illustrate the working of a change-speed-gear.

On Fig. 1, the automatic lathe 1 has, fixed on the lower part of its frame, a driving motor 2 on the shaft of which is fixed a pulley 3. A shaft 4 rotatably supported on blocks 6—7 solid with the frame of the lathe, is set in motion by motor 2 through a belt 8. This shaft 4 imparts rotation to a shaft 9 by means of a set of gears 10—11. Finally, this shaft 9 is connected by means of a set of interchangeable gears 12—13 with a main shaft 14 of a change-speed-gear. The said change-speed-gear has (Fig. 2) four sets of parallel gears connecting this main shaft 14 with a driven shaft 15, four friction-couplings 16—16a, 17—17a, 18—18a, 19—19a, and a coupling 20 actuating one way only. The four friction couplings are constituted by two double friction couplings, the main parts 16—17 as well as the driven parts 18—19 being respectively integral one to the other and fixed angularly in regard to shafts 14 and 15 respectively, but can slide axially on them. The movements of engaging and freeing these double friction couplings are governed, as in all known lathes, by cams 22—23 fixed on auxiliary shafts 21—24.

Parts 16a, 17a, 18a, 19a are pivoted loose on main shaft 14, respectively driven shaft 15. Parts 17a, 18a and 19a are each integral with a gear member 25—26—27 each comprising two gears 30—31, 32—33, 34—35 integrally connected to one another. On the other hand, part 16a is formed from gear 28. Lastly on shaft 14 is also mounted the coupling 20 actuating one way only (Figs. 2 and 3), one part of which is formed from a cog-wheel 29, while the other is connected with shaft 14.

Gear 28 engages into gear 32, which with gear 33 is a part of gear member 26. The gear 33 engages with gear 30, which is formed with gear 31 of the gear member 25 and engages into gear 34. The latter with gear 35 forms the gear member 27 and engages into a gear 29. These gears constitute four sets of gears connecting shaft 14 to shaft 15 and which, by the play of the double friction couplings, can be coupled each separately, or several in series (Figs. 4 to 9) according to the desired rate of transmission.

The schemata of Figs. 4 to 9 illustrate the working of this change-speed-gear.

The motions of engaging and of disengaging the friction couplings are governed by cams 22 respectively 23, by means of levers (one of which, 36, alone is shown).

Main shaft 14 being actuated at a constant speed by motor 2, it is seen that the spindle can be actuated at six different speeds according to the respective positions of the two double friction couplings.

(1) Coupling 19—19a in engaged position (Fig. 4). The actuating of the spindle is effected by the intermediary of the one-way coupling, gears 29 and 35, gear member 27 and coupling 19—19a. The couplings 16—16a and 17—17a are in the loose position.

Gear members 25 and 26 revolving loose on their shaft, this speed is the lowest.

Figure 5:
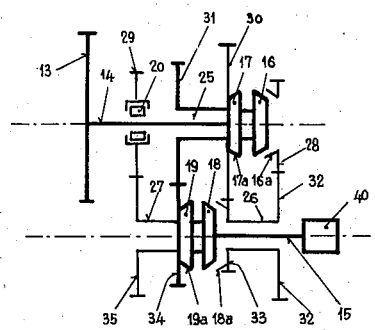

(2) Couplings 17—17a and 19—19a being in the engaged position (Fig. 5).

The actuating of the spindle is effected by means of friction coupling 17—17a, gear members 25 and 27 by their gears 31 and 34 which are in mesh, friction coupling 19—19a. The transmission ratio between gears 31 and 34 must be higher than that between gears 29 and 35, so that the actuated part 29 of the one-way coupling revolves quicker than the actuating part of this coupling.

Figure 6:
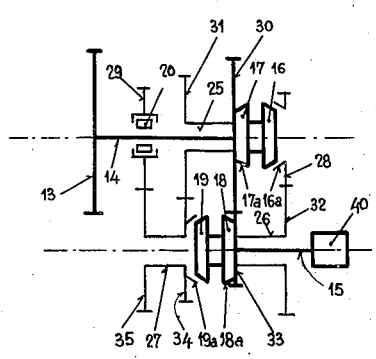

(3) Couplings 17—17a and 18—18a in engaged position (Fig. 6).

The actuating is effected by gears 30 and 33 of cog-organs 25 and 26, the gear member 27 and gear 29 revolving loose.

Figure 7:
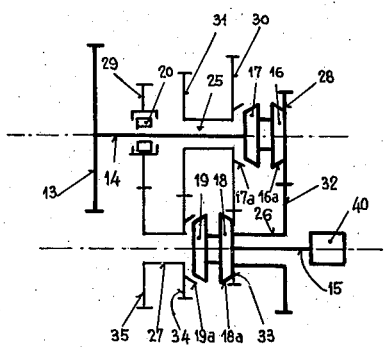

(4) Couplings 16—16a and 18—18a in engaged position (Fig. 7).

The actuating of the spindle is effected by gear 28 in mesh with gear 32 of cog-organ 26. The gear members 25 and 27 revolve loose.

Figure 8:
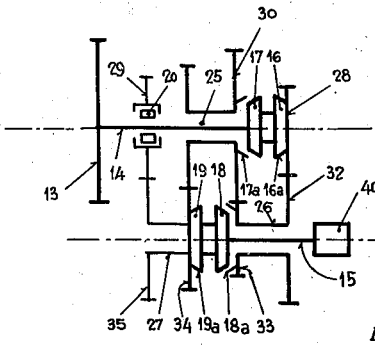

(5) Couplings 16—16a and 19—19a in engaged position (Fig. 8).

The actuating is effected by gear 28 gear members 26, 25 and 27.

Figure 9:
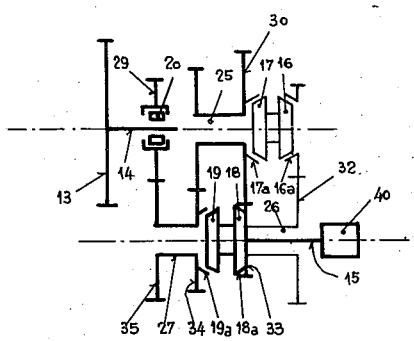

(6) Coupling 18—18a in engaged position (Fig. 9).

The actuating of the spindle is then effected by the one-way coupling and the gear members 27, 25, 26 at a slightly higher speed than that under number (1). The couplings 16—16a and 17—17a are in the disengaged position.

As can be ascertained, the first four speeds are obtained by the coupling of one or the other of the four sets of gears, while the other two are obtained by putting in series three of them. Thanks to this combination it is possible to obtain a very high and a very low speed without having for this to resort to gears of exaggerated dimensions. In order to put in series several sets of gears, it is necessary that at least two gears be jointed to one another and to one of the parts of one of the two double couplings mounted loose on their shaft, and that each of said gears be in mesh with one gear jointed to one of the two parts of the other double friction coupling mounted loose on their shaft.

On the other hand, gear member 25, which acts on an actuating couple when it is attached by gear 34 as well as when attached by gear 33, must be provided in a single piece, or at least must be constituted by pieces solidly joined to one another.

Figure 10:
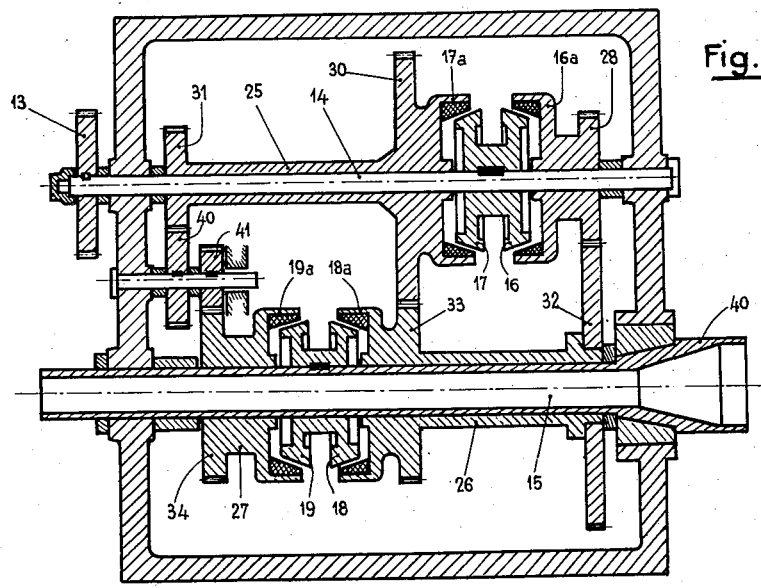
Fig. 10 is a cross section following line 2—2 of Fig. 1, of a second variant execution of a change-speed-gear.
Figure 11:
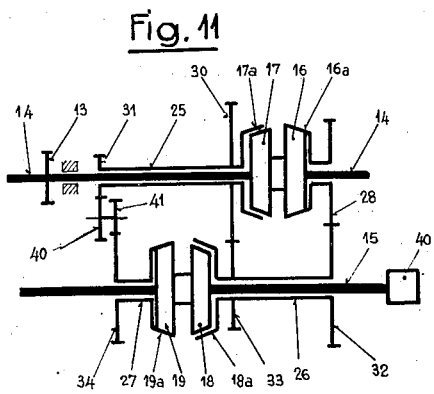
Figs. 11 to 14 are schematic views meant to illustrate the working of the change-speed-gear shown on Fig. 10.
Figure 14:
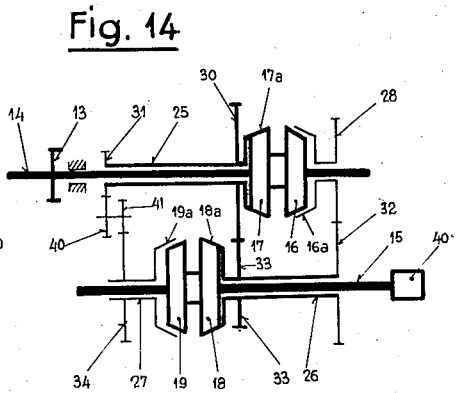
Figure 12:
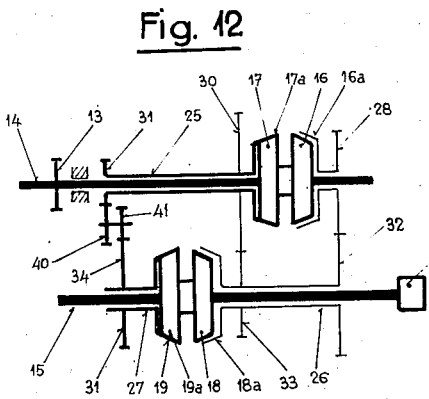
Figure 13:
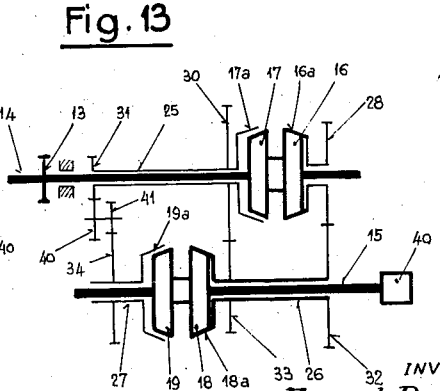

Fig. 10 shows a variant execution having no one-way coupling and which, by the single play of two double friction couplings, allows to realise four different speeds.

In this figure, the same reference numbers as those used in Fig. 1 have been employed to denote organs having the same function.

Gear member 27 has only one gear 34 in mesh with a set of interchangeable gears 40—41 engaging in gear 31 of gear member 25. As can be ascertained by examining schemata Figs. 11 to 14, this change-speed-gear has:

(1) A low speed for screw-cutting (Fig. 11), couplings 16—16a and 19—19a in engaged position;

(2) A high speed for screw-cutting (Fig. 12) couplings 17—17a and 19—19a in engaged position;

(3) A low speed for lathe work (Fig. 13) couplings 16—16a and 18—18a in engaged position;

(4) A high speed for lathe work (Fig. 14), couplings 17—17a and 18—18a in engaged position.

At the low and the high speed for screw-cutting, the spindle is actuated in the opposite direction of the high and low speeds for lathe work.

As will be easily noticed, no flexible means of transmission, such as a chain or the like, is interposed between the main shaft of the change-speed-gear and the spindle. It follows that the maximum speed of the latter is no longer limited by the maximum speed permissible for a transmission chain, and it becomes then possible to revolve the spindle at a higher speed, which means to work on the piece at the cutting speed admissible today, thanks to the high-speed steels and hard metals used in the manufacture of bearings and cutting tools. Moreover, though the change-speed-gear as described has only two shafts (one main shaft and one driven shaft constituted by the spindle shaft), the scale between the highest and the lowest speed can be relatively high, for instance equal to 8 or 10 by using gears of comparatively small diameter. It follows that the kinetic energy of the masses in motion is comparatively small, which gives the advantage of allowing a quick passage from one speed to another. Finally the rotation speed of the piece for a given cutting speed being function of the diameter of the piece worked upon, it is necessary to be able to adapt the angular speed of the main shaft 14 to the diameter of the piece worked upon. This regulating of the rotation speed of the main shaft is very easily obtained thanks to the set of interchangeable gears 12—13. On the other hand the set of gears 40—41 enables to alter the scale between the highest and the lowest transmission speed of the change-speed-gear, and therefore to adapt the rotation speeds of the spindle to the kinds of work to be effected and to the nature of the matter being worked upon.

I claim:

1. In an automatic single spindle lathe, a change-speed-transmission including a gear housing, a pair of parallel shafts journaled in the housing, one of said shafts being a constant speed drive shaft and the other of said shafts being a variable speed driven shaft, sets of parallel constantly meshing gears loosely mounted on said drive and said driven shafts, a double friction coupling splined to each shaft, each coupling comprising a friction clutch, one of said double couplings being carried by a drive shaft and the other by a driven shaft, said shafts being connected together by said gear sets, each gear set having a part of one clutch of its respective double coupling integral therewith, each gear set being loosely mounted on its shaft and including two gears each in mesh with the opposite gears of another set of gears mounted parallel thereto, one gear of each set being in mesh with a gear which carries a part of one of the said friction clutches of each of the double couplings, said parts of the friction clutches being loose on their respective shafts when uncoupled from the adjacent side of their respective double coupling, a one-way coupling mounted for rotation on said drive shaft, and a gear carried by said coupling in mesh with a gear of one of said gear sets on the driven shaft.

2. In an automatic single spindle lathe, a change-speed-transmission including a gear housing, a pair of parallel shafts journaled in the housing, one of said shafts being a constant speed drive shaft and the other of said shafts being a variable speed driven shaft, sets of parallel constantly meshing gears loosely mounted on said drive and said driven shafts, a double friction coupling splined to each shaft, each coupling comprising a friction clutch, one of said double couplings being carried by a drive shaft and the other by a driven shaft, said shafts being connected together by said gear sets, each gear set having a part of one clutch of its respective double coupling integral therewith, each gear set being loosely mounted on its shaft and including two gears each in mesh with the opposite gears of another set of gears mounted parallel thereto, one gear of each set being in mesh with a gear which carries a part of one of the said friction clutches of each of the double couplings, said parts of the friction clutches being loose on their respective shafts when uncoupled from the adjacent side of their respective double coupling, a one-way coupling mounted for rotation on said drive shaft, a gear carried by said coupling in mesh with a gear of one of said gear sets on the driven shaft, a power source and interchangeable gears interconnecting said power source with said drive shafts whereby the constant speed of the drive shafts may be adjusted.

ERNEST BODMER.

REFERENCES CITED

The following references are of record in the file of this patent:

UNITED STATES PATENTS

| Number | Name | Date |
|---|---|---|
| 787,392 | Norris | Apr. 18, 1905 |
| 788,658 | Le Blond et al. | May 2, 1905 |
| 1,038,787 | Potter | Sept. 17, 1912 |
| 1,899,027 | Foster | Feb. 28, 1933 |
| 1,987,006 | Foster | Jan. 8, 1935 |
| 2,012,083 | Schellenbach | Aug. 20, 1935 |
| 2,303,270 | Grover | Nov. 24, 1942 |

FOREIGN PATENTS

| Number | Country | Date |
|---|---|---|
| 229,312 | Germany | Dec. 10, 1910 |
| 354,988 | Germany | June 19, 1922 |
| 391,062 | France | June 9, 1918 |